United States Patent [19]

Perry, Jr. et al.

[11] 4,180,391
[45] Dec. 25, 1979

[54] GAS PARTICULATE SEPARATOR WITH SCAVENGING GAS SEPARATION DEVICE

[75] Inventors: Marney D. Perry, Jr., Mineral Wells, Tex.; Robert A. Graff, Suwannee County, Fla.

[73] Assignee: Perry Equipment Co., Mineral Wells, Tex.

[21] Appl. No.: 805,848

[22] Filed: Jun. 13, 1977

[51] Int. Cl.$^2$ .............................................. B01D 50/00
[52] U.S. Cl. ............................... 55/324; 55/319; 55/337; 55/343; 55/396; 55/347; 55/424; 55/428
[58] Field of Search ................. 55/324, 337, 347, 396, 55/449, 450, 319–321, 330, 343, 348, 394, 424, 428, 448, 456

[56] References Cited

U.S. PATENT DOCUMENTS

| | | | |
|---|---|---|---|
| 1,735,298 | 11/1929 | Pfeffer | 55/396 X |
| 2,193,883 | 3/1940 | Reeves | 55/337 |
| 3,010,537 | 11/1961 | Baker et al. | 55/337 X |
| 3,360,908 | 1/1968 | Baily | 55/347 |
| 3,793,812 | 2/1974 | Willis | 55/347 X |
| 3,802,167 | 4/1974 | Turman | 55/396 |
| 3,884,660 | 5/1975 | Perry, Jr. et al. | 55/396 |
| 3,888,644 | 6/1975 | Holland et al. | 55/324 X |
| 4,008,059 | 2/1977 | Monson et al. | 55/396 |

FOREIGN PATENT DOCUMENTS

| | | | |
|---|---|---|---|
| 170268 | 2/1952 | Austria | 55/396 |
| 468487 | 10/1950 | Canada | 55/396 |

*Primary Examiner*—Kathleen J. Prunner

[57] ABSTRACT

A separator is disclosed for removing from a gas stream suspended particulates such as liquid droplets and finely divided solids. A housing chamber encloses a tube that contains a gas swirl device for imparting a swirling motion to the gas stream entering the inlet of the tube. A separator conduit is axially aligned with the tube and has its upstream end coaxially located in the downstream end of the tube, defining an annular ejection port. Suspended particulates and scavenging gas are discharged into the chamber through the annular ejection port. The downstream end of the separation conduit is in communication with the outlet of the housing. A passage is provided for returning the scavenging gas to the main gas stream at the outlet of the housing. A separation device is located in the passage to cleanse the scavenging gas of suspended particulates prior to recombination with the main gas stream.

6 Claims, 6 Drawing Figures

GAS PARTICULATE SEPARATOR WITH SCAVENGING GAS SEPARATION DEVICE

BACKGROUND OF THE INVENTION

1. Field of the Invention

This invention relates in general to a separator for removing liquid droplets and finely divided solids from a gas stream, more particularly to a vortical-type separator that contains means for returning cleansed scavenging gas to the gas stream.

2. Description of the Prior Art

One type of separator for separating suspended particulates such as liquid droplets and finely divided solids from a gas stream imparts rotary motion to the gas stream in a conduit within a tubular chamber. This forces the particulates against the wall of the conduit, which are then stripped off through one or more annular ejection orifices or ports in the conduit. These particulates and a portion of the gas are ejected through the inertial action aided by the sweeping action of discharged or scavenging gas in the housing chamber. The flow of the scavenging gas in the chamber may be caused by an auxiliary scavenging gas blower. The blower can either return the scavenging gas to the main gas stream or discharge it to the atmosphere.

One system that does not require an external blower is shown in our U.S. Pat. No. 3,884,660, which teaches a separator with an upstream annular injection orifice. This causes recirculation of the scavenging gas to increase the efficiency for particulate removal.

SUMMARY OF THE INVENTION

It is a general object of this invention to provide a new vortical-type separator that utilizes a flow of scavenging gas to increase the efficiency of suspended particulate removal without the use of external gas blowers or a recirculation system.

It is a further object of this invention to provide a new vortical-type separator that employs an internally generated pressure differential to achieve a flow of scavenging gas.

It is a further object of this invention to provide a new vortical-type separator that employs an internally generated pressure differential to achieve a flow of scavenging gas, and that cleanses and recombines the scavenging gas flow with the cleansed gas leaving the vortical separator, without the use of gas blowers or recirculation systems.

In accordance with these objects, the separator is of a vortical type having a chamber containing axial vortical separators. A gas swirl device is coupled to the inlet tube to impart a swirling motion to the gas stream, forcing the suspended particulates against the wall. One or more annular ejection ports are formed in the vortical separator conduits to remove the suspended particulates and eject a portion of the gas, which enters the scavenging gas stream. A passage is provided for the scavenging gas stream from the portion of the chamber surrounding the annular ejection ports to the outlet of the chamber. Because of the pressure drop from the inlet to the outlet, the pressure at the outlet is lower than the pressure in the scavenging gas chamber. This pressure differential causes the scavenging gas in the chamber to be drawn back into the cleansed gas stream at the chamber outlet, creating a scavenging gas flow. Various filtration and/or separator means are placed in the path of the flow of the scavenging gas prior to re-entrance back into the gas stream.

DESCRIPTION OF THE PREFERRED EMBODIMENT

Figure 1:
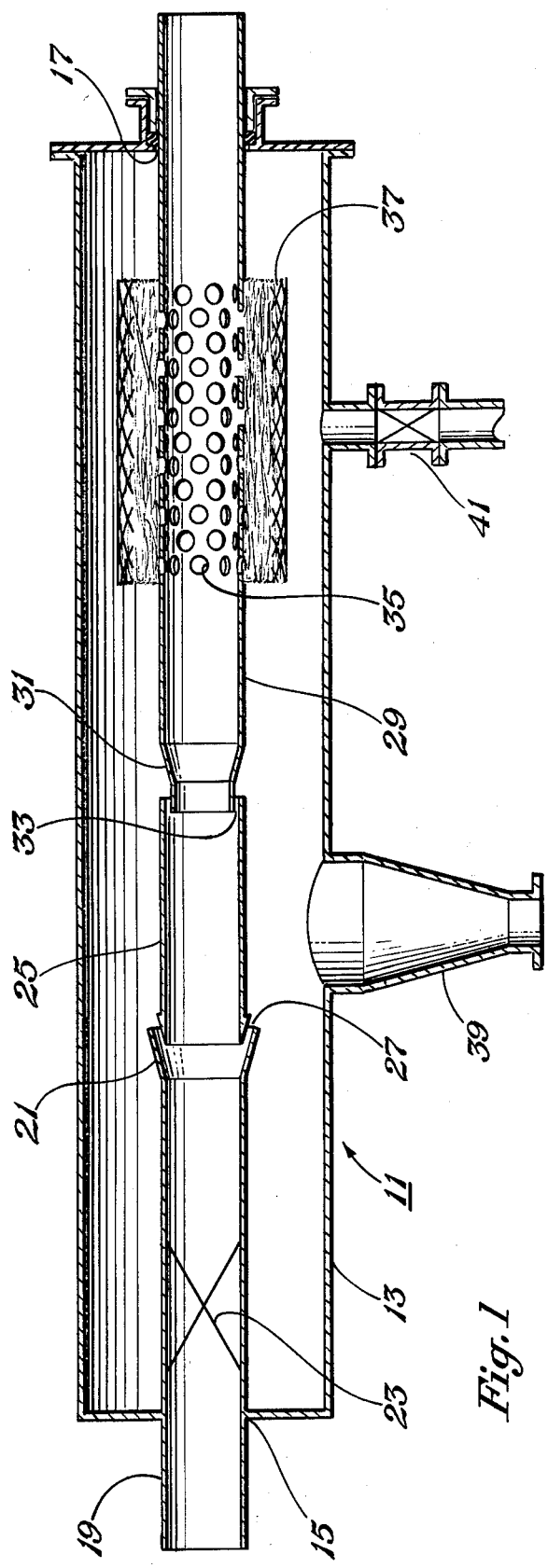
FIG. 1 illustrates a simplified sectional view of a vortical separation device for the removal of suspended particulates from gas streams constructed in accordance with this invention.

Referring to FIG. 1, a separator assembly 11 is shown that is adapted for use with dry gas streams for removing finely divided solids. The separator assembly includes a housing chamber 13 having a tube inlet 15 and a tube outlet 17. A tube 19 has its upstream end or inlet extending into the inlet 15 and its downstream end 21, which may be defined as a separation tube, in the housing chamber 13. The downstream end 21 is flared outward and faces downstream.

A gas swirl means or vortex generator 23 is located in the tube 19. Vortex generator 23 comprises two semi-elliptical baffle plates for imparting a swirling motion to the gas stream, as shown in more detail in our U.S. Pat. No. 3,884,660. Other types of swirl devices may be employed as well.

A separation conduit 25 is axially aligned with the tube 19. The upstream end of separation conduit 25 is coaxially located within the flared downstream end 21 of tube 19. An annular clearance or ejection port 27 is provided between the upstream end of separation conduit 25 and downstream end 21.

An outlet conduit 29 is axially aligned with the tube 19 and separation conduit 25. The upstream end 31 is reduced in size and is located within the downstream end of the separation conduit 25. Tube 19, separation conduit 25, and outlet conduit 29 are held in axial alignment by external structural members (not shown). The downstream end of outlet conduit 29 extends out of outlet 17 of the housing chamber 13. An annular clearance or second ejection port 33 is provided between the upstream end 31 and downstream end of the separator conduit 25. A plurality of apertures 35 are formed through the side walls of outlet conduit 29 intermediate its ends. These apertures serve as passage means for the flow of scavenging gas back to the cleansed gas stream in conduit 29.

Separation means comprising an annular gas filter element 37 slides over outlet conduit 29 and covers apertures 35 for filtering the scavenging gas as it returns to the cleansed gas stream in conduit 29. Filter element 37 can be of various types of permeable material such as reticulated glass fibers and pleater paper, and may be of various shapes and sizes.

Means for removing accumulated particulates from the bottom of the chamber 13 include a cleanout conduit 39 on the bottom of chamber 13 between the annular ejection ports 27 and 33. A blow-off valve 41 is located in the wall of chamber 13 adjacent filter element 37 for removing particulates that accumulate on the outside of filter element 37 by blowing air or gas in reverse and removing the particulates through blow-off valve 41.

In the operation of the separator of FIG. 1, the gas stream enters the inlet of tube 19. As it passes the vortex generator 23, a swirling motion is created, forcing heavier components such as finely divided solids to the wall of tube 19. These particulates are forced along the walls of tube 19 at a point downstream from vortex generator 23 and out the first ejection port 27, along with a certain amount of gas from the gas stream. Residual particulates are forced against the walls of separation conduit 25 and are forced out the second ejection port 33, along with a portion of gas from the gas stream. The gas stream, thus cleansed, passes through outlet conduit 29 and out of the housing chamber 13.

The rotating gas stream upon contact with ejection ports 27 and 33, releases a portion of the kinetic energy contained in the gas stream, which is converted to pressure energy, and results in a pressure build-up within housing chamber 13. This pressure build-up can be likened to the conversion of velocity head to pressure head that occurs during centrifugal gas compression, and ejection ports 27 and 33 tend to accomplish the same function as the diffuser section of a centrifugal compressor.

To illustrate this kinetic energy to pressure conversion, actual test data covering a three inch inside diameter vortical separator tube indicates that at an inlet axial air velocity of 100 feet per second at ambient conditions, a total pressure loss of 12.75 inches of water column was expended across the vortical separation tube. However the housing chamber 13 developed an internal pressure of 9.25 inches of water column, indicating a 72.5% pressure recovery. Thus, a pressure differential of 9.25 inches of water column existed between housing chamber 13 and its outlet.

This pressure differential is employed by the use of apertures 35 to sweep the gas discharged at ejection ports 27 and 33, or scavenging gas, back into the main stream. The sweep of the scavinging gas aids in the discharge of suspended particulates at ejection ports 27 and 33 since they will be swept out of the ejection ports along with the gas entering the scavenging gas stream. Filter element 37 removes particulate matter from the scavenging gas as it passes through apertures 35 into the outlet conduit 29 to rejoin the main gas stream. Solids separated from the gas will accumulate on the bottom of the chamber, to be cleaned out through clean-out conduit 39. Preferably the size of the gas filter 37 and apertures 35 are selected so as to allow an initial scavenging flow of approximately 10% of the total gas flow through the separator system.

Figure 2:
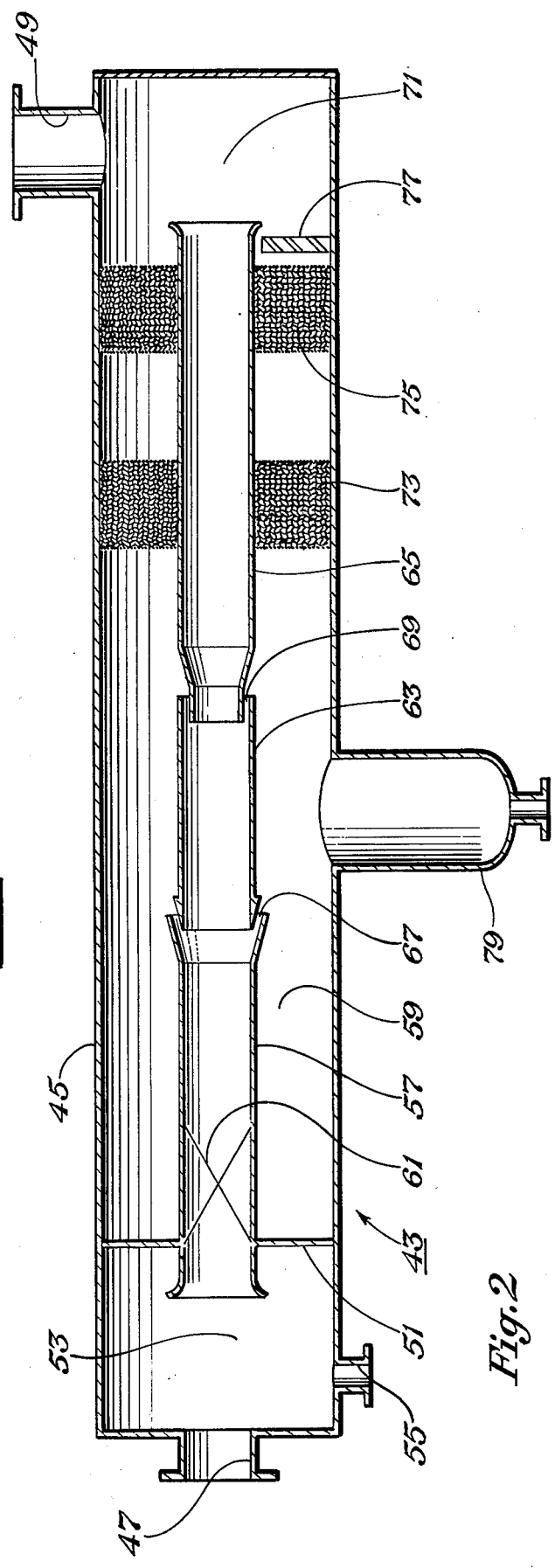
FIG. 2 illustrates another vortical separator constructed in accordance with this invention.

FIG. 2 illustrates a separator assembly 43 for separating liquid particulates. A tubular housing chamber 45 has an inlet 47 and outlet 49. The inlet means includes a partition 51 positioned near the inlet 47, defining a free liquid separation zone 53 between it and inlet 47. A drain 55 is located in the bottom of the free liquid separation zone 53. The upstream end of tube 57 extends into the free liquid separator zone 53, and the downstream end which may be defined as a separation tube, is located in the scavenging gas plenum 59 of housing chamber 45. A vortex generator 61 is located in the tube 57. A separation conduit 63 and outlet conduit 65 are carried axially aligned with tube 57, their upstream ends being coaxially located within the downstream end of the adjacent conduit, defining first and second annular ejection ports 67, 69. The downstream end of conduit 65 terminates within chamber 45 in an outlet zone 71 near outlet 49.

A pair of annular mist eliminators 73, 75 are located sealingly within the chamber 45, separating the scavenging gas portion or plenum 59 from the outlet zone 71. They are provided for removing liquid droplets in the scavenging gas stream. Outlet conduit 65 extends sealingly through the mist eliminators 73, 75, requiring all scavenging gas to flow through them in order to reach the outlet zone 71. They may be constructed of permeable materials such as knitted wire mesh or be of other known mist elimination construction. A segmental seal baffle 77 is located immediately downstream from the downstream mist eliminator 75. Baffle 77 extends upward from the bottom of chamber 45 to immediately below the outlet conduit 65, and prevents separated liquid from entering the outlet zone 71. An accumulator 79 extending from the bottom of chamber 45 allows the separated liquid to be removed.

In the operation of FIG. 2, the gas stream enters inlet 47, with the bulk liquids being separated in the free liquid separation zone 53. The gas stream then enters in the tube 57 and vortex generator 61. The rotary motion imparted to it forces the liquid droplets against the walls of the separation portion of tube 57 and separation conduit 63, and out annular ejection ports 67, 69, along with a portion of scavenging gas. The opening above segmental baffle 77 provides passage means for the scavenging gas to flow from the scavenging chamber 59 to the outlet zone 71 of chamber 45. As the scavenging gas passes through mist eliminators 73, 75, entrained liquid droplets are removed.

Figure 3:
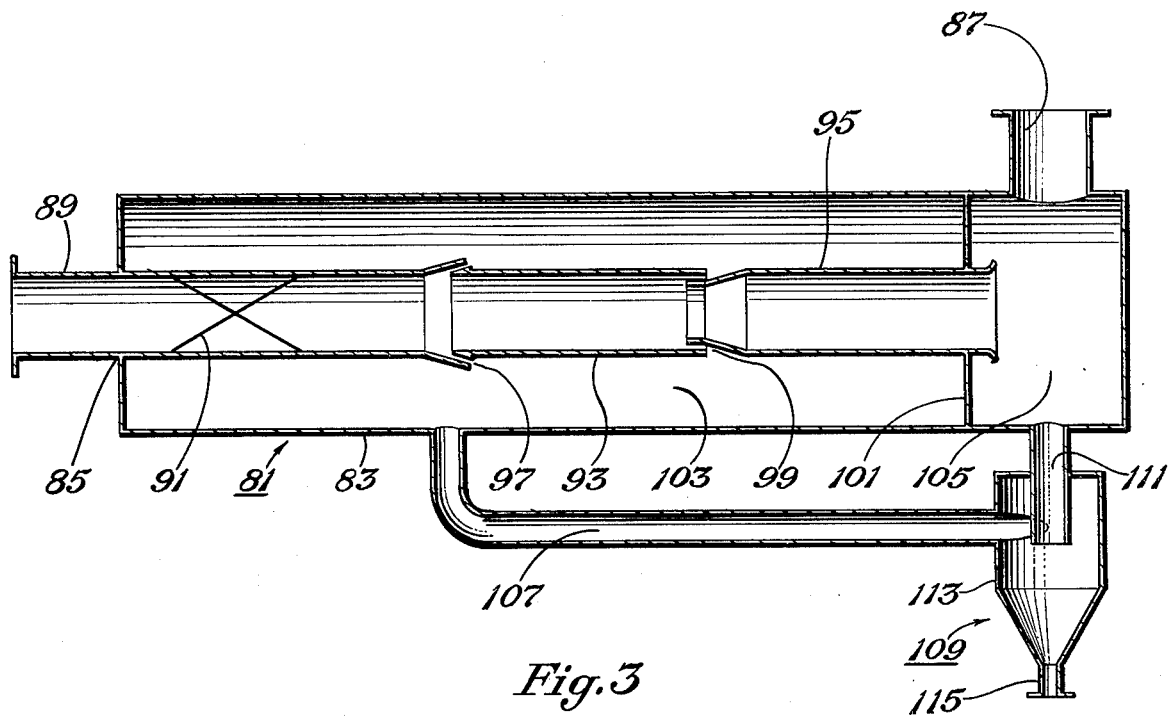
FIG. 3 illustrates still another vortical separator constructed in accordance with this invention.

FIG. 3 illustrates a separator assembly 81 that utilizes a cyclone type separator for separating suspended particulates from the scavenging gas. Separator assembly 81 includes a housing chamber 83 having a tube inlet 85 and an outlet 87. The axial vortical separator includes tube 89, a vortex generator 91 located within tube 89, separation conduit 93, and outlet conduit 95. The upstream ends of the separation conduit and outlet conduit are carried coaxially in the downstream ends of the adjacent conduit, defining first and second annular ejection ports 97, 99. Tube 89 extends into the inlet 85 of the housing. A partition 101 is positioned in housing chamber 83 near outlet 87 to divide the housing chamber into a scavenging gas plenum 103 and an outlet plenum 105. Passage means for conveying the scavenging gas flow from the scavenging plenum 103 to the outlet plenum 105 includes a first tube 107 extending exterior of housing chamber 83 from the scavenging gas plenum 103 to the inlet of a cyclone separator 109. A second tube 111 extends from the outlet of cyclone separator 109 to the outlet plenum 105. Cyclone separator 109, which serves as separation means for the scavenging gas, is a conventional type having a cylindrical chamber 113 and a conical portion and drain 115 extending below. The top of the chamber 113 is closed and receives the second or exit tube 111. The tube enters the side wall of the cylindrical chamber 113.

In operation of the separator of FIG. 3, the gas stream enters the inlet of tube 89 and passes into the vortex generator 91, causing a swirling motion to force suspended particulates out annular ejection ports 97 and 99. The gas stream then proceeds out outlet conduit 95 into outlet plenum 105 and out of the chamber at outlet 87. The pressure in outlet plenum 105 is lower than the pressure in the scavenging gas plenum 103, as explained in connection with the description of the separator of FIG. 1, causing the scavenging gas to flow through tube 107, into the cyclone separator 109 and into the outlet plenum 105 through tube 111. Suspended particulates in the scavenging gas are separated in the cyclone separator in a known manner and discharged through drain 115.

Figure 4:
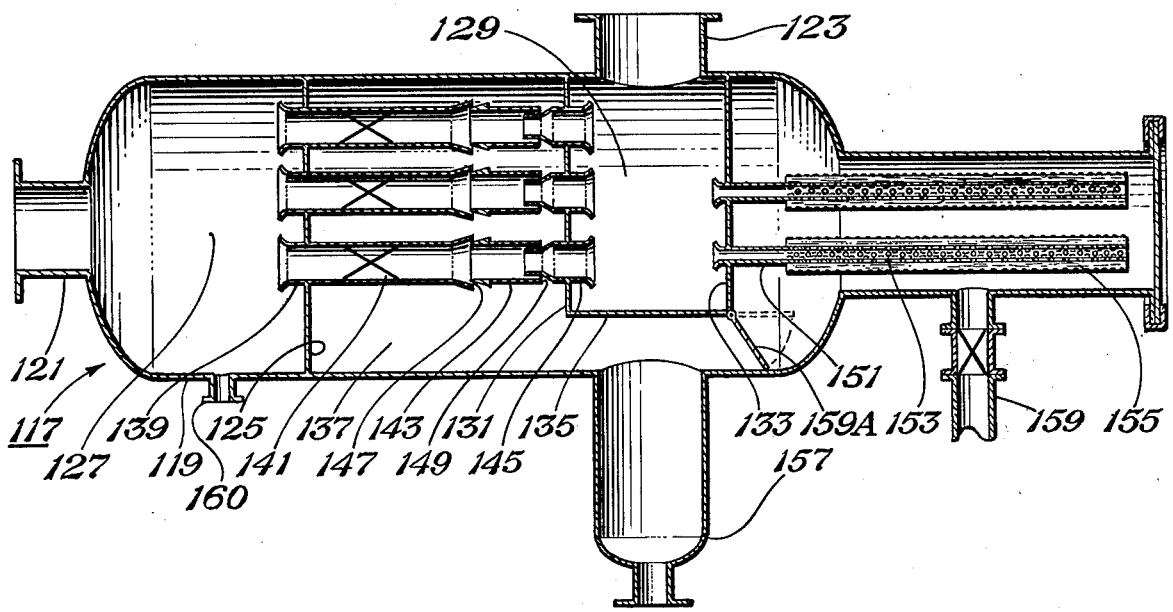
FIG. 4 illustrates still another vortical separator constructed in accordance with this invention.

FIG. 4 illustrates a horizontal multiple tube vortical separator 117 for the separation of liquid droplets and finely divided solids. The tubular housing chamber 119 has an inlet 121 on one end and an outlet 123 extending vertically upward from housing chamber 119. A vertical partition 125 is spaced in housing chamber 119 a selected distance from inlet 121, defining a free liquid separation zone 127 as a part of the inlet means. An outlet plenum 129 is constructed around outlet 123, having an upstream sidewall 131, downstream sidewall 133, and a closed bottom 135. A plurality of vortical separation units extend between the free liquid separation zone 127 and the outlet plenum 129, discharging suspended particulates and scavenging gas into the scavenging gas plenum 137, which is the remaining portion of housing chamber 119. These vortical separators, as in the other embodiments, include a tube 139, vortex generator 141, separation conduit 143, and outlet conduit 145. These conduits are axially aligned and positioned to define a first annular ejection port 147 and second annular ejection port 149. The upstream end of the inlet conduit 139 extends into partition 125 and the downstream end of the outlet conduit 145 extends through the upstream sidewall 131 of the outlet plenum 129.

A smaller section of housing chamber 119 extends outwardly from the downstream end of the housing chamber and houses two support means or filtration conduits 151 for supporting annular filter elements 155. Each filtration conduit 151 has a closed end and extends into this smaller section of housing chamber 119, which is also a part of the scavenging gas plenum 137. Thus the scavenging gas plenum 137 comprises two portions on opposite sides of the outlet plenum 129 in fluid communication with each other by way of the space below bottom 135 of the outlet plenum 129. The downstream or open end of each filtration conduit 151 extends through the downstream sidewall 133 of outlet plenum 129. As can be seen, outlet conduits 145 and the downstream or outlet ends of conduits 151 generally face each other in the outlet plenum 129. A plurality of apertures 153 in the filtration conduits 151 provide passage means for scavenging gas to flow to the outlet plenum 129. Thus each conduit 151 with its apertures 153 forms a flow path means from the scavenging gas plenum 137 to the outlet plenum 129. Annular filter elements 155 slide over the conduits 151 and enclose apertures 153 to separate suspended particulates from the scavenging gas as it flows through the apertures. Means for removing separated particulates from the scavenging gas chamber 137 include an accumulator 157 in the bottom of housing chamber 119 and a blow-off connection 159 adjacent filtration conduits 151. A drain 160 is located in the bottom of free liquid separation zone 127. A valve 159A is normally located in the position shown in dotted line. During blow-off it is located in the position shown in solid line. Control means (not shown) is provided for locating the valve 159A in the two positions.

In the operation of the separator of FIG. 4, gas enters inlet 121 and free liquid separation zone 127, where liquids that are free are separated. The gas stream proceeds through the vortical separator units, with suspended particulates being ejected at the annular ejection ports 147 and 149, along with scavenging gas. The scavenging gas passes through the filter elements 155, apertures 153, and into the outlet plenum 129, rejoining the main gas stream. Accumulated particulates are removed from drain 160 and accumulator 157. Valve 159A is closed as shown in the solid lines during blow-off to prevent blow-off air or gas from circulating through the vortical separators, which reduces the differential pressure across the filter elements 155.

Figure 5:
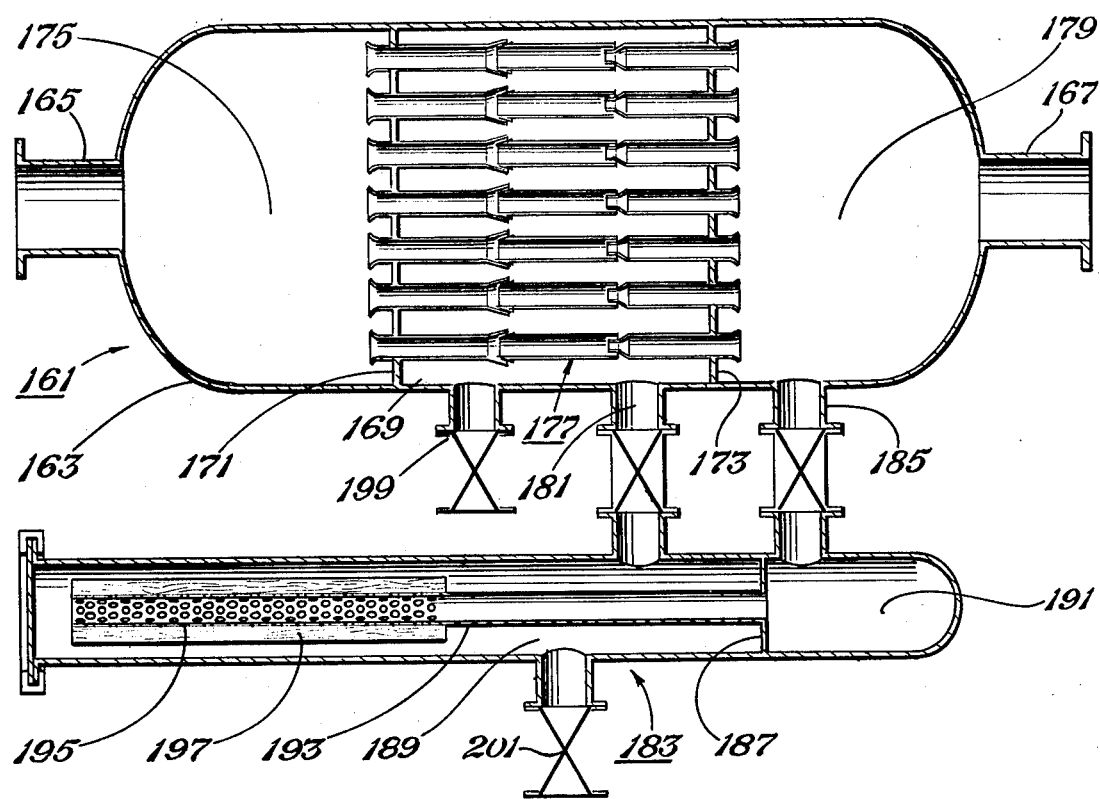
FIG. 5 illustrates still another vortical separator constructed in accordance with this invention.

FIG. 5 illustrates a horizontal, multiple tube vortical separator assembly 161, employing an external scavenging gas separation system. Housing chamber 163 has an inlet 165 and an outlet 167 on each end. A plurality of vortical tube separators, designated as numeral 177 are mounted horizontally between vertical partitions 171 and 173. These partitions divide the housing chamber 163 into inlet plenum 175, scavenging gas plenum 169, and outlet plenum 179. The vortical tube separators are the same as described in connection with the other embodimends, having inlet, separation, and outlet conduits, a vortex generator, and two ejection ports.

A first tube 181 extends externally from the scavenging gas chamber 169 to the inlet of an external separation or filtration chamber 183. A second tube 185 extends from the outlet of filtration chamber 183 to the outlet plenum 179 of housing chamber 163. Filtration chamber 183 has a vertical partition 187 separating the inlet and outlet of the filtration chamber 183, defining an inlet plenum 189 and an outlet plenum 191. A closed-end filtration conduit 193, or support means for supporting filter element 197, is located in the inlet plenum 189 with its downstream open end in the outlet plenum 191. Filtration conduit 193 has a plurality of apertures 195 to serve as passage means for the scavenging gas stream. An annular filter element 197 slides over the filtration conduit 193, enclosing apertures 195 to filter liquid droplets and finely divided solids form the scavenging gas stream.

A discharge valve 199 is located at the bottom of the scavenging gas chamber 169 to remove accumulated heavier components. Tubes 181 and 185 also contain valves to allow the filter element 197 to be cleaned or removed without shutting off the main gas stream. A valve 201 in the filtration chamber 183 allows pressure to be bled off the filtration chamber for the exchange or cleaning of the filter element 197.

In the operation of the separator of FIG. 5, the gas stream enters inlet plenum 175 and passes through the vortical separation units 177 to outlet plenum 179. Suspended particulates are discharged in the scavenging gas chamber 169. Scavenging gas flows through tube 181 into the inlet plenum 189 of the filtration chamber 183. Scavenging gas passes through filter 197, apertures 195, and into the outlet plenum 191 of the gas filtration chamber 183. Scavenging gas then flows through tube 185 to outlet plenum 179 to rejoin the main gas stream. Should it be desired to change the filter element, the valves in tubes 181 and 185 are closed, while valve 201 is opened to bleed off the pressure in the filtration chamber 183.

Figure 6:
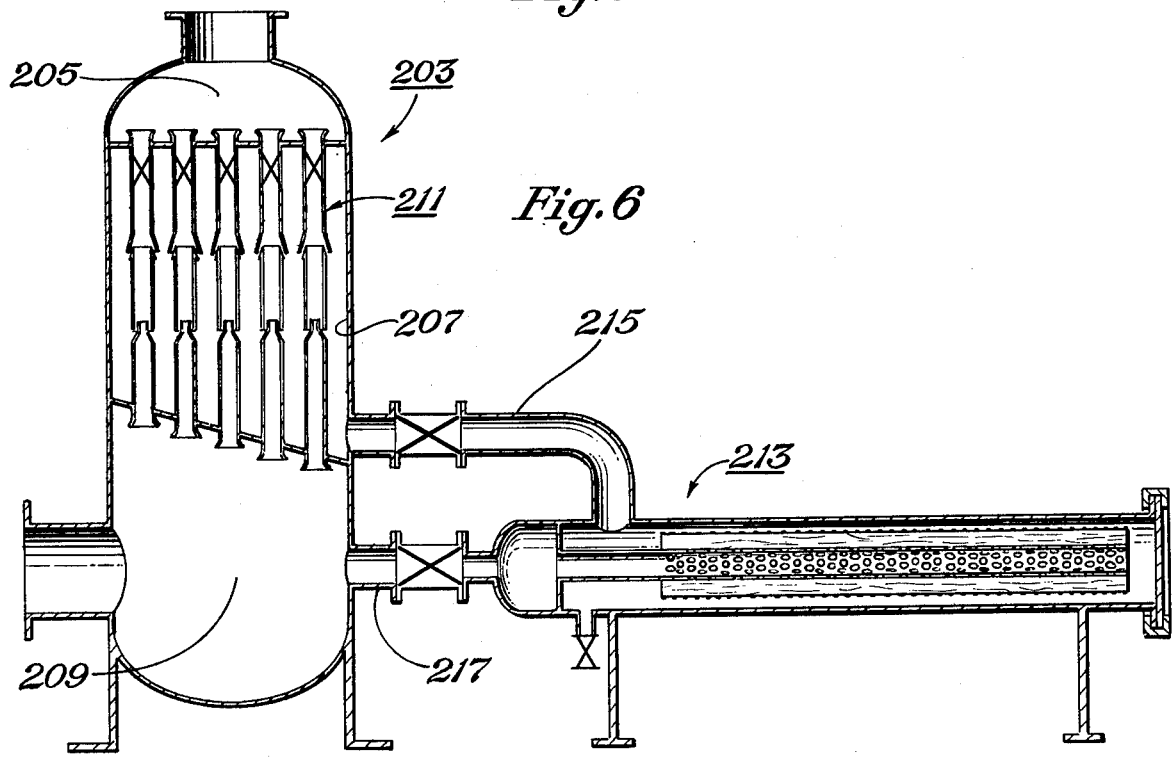
FIG. 6 illustrates still another vortical separator constructed in accordance with this invention.

FIG. 6 illustrates a vertical, multiple tube type vortical separator 203 with an external horizontal scavenging gas separation system. Vortical separator 203 is similar to the separator system of FIG. 5, except that vertical positioning of the vortical separator provides for more effective separation of liquid particulates, making this type of unit highly effective for the removal of both solid and liquid particulates from gas streams.

The housing chamber is divided by horizontal partitions into an inlet plenum 205, scavenging gas plenum 207, and outlet plenum 209. The vortical tube separators 211 are mounted vertically and include inlet, separator, and outlet conduits, and a vortex generator and two annular ejection ports, as described in connection with the other embodiments. The external filtration assembly 213 is identical to that described of FIG. 5. The filtration assembly 213 is connected to the scavenging gas plenum 207 by tube 215 and to the outlet plenum 209 by tube 217.

In the operation of the separator of FIG. 6, gas enters inlet plenum 205, and is cleansed of suspended particulates as it flows to outlet plenum 209 through the vortical separators 211. Scavenging gas proceeds to the filtration assembly 213 via tube 215, and back to the main stream through tube 217 after being cleansed.

It should be apparent that an invention having significant advantages has been provided. The separator utilizes a scavenging gas stream without the use of external blowers or a recirculation system. The scavenging gas stream is driven by the pressure differential between the chamber at the ejection ports and at the outlet. Separation means placed in the passage allow the scavinging gas to rejoin the cleansed gas stream.

Having described the invention in connection with certain embodiments thereof, it should be apparent to those skilled in the art that it is not so limited but is susceptible to various changes and modifications without departing from the spirit thereof. For example although all of the embodiments disclosed two annular ejection ports, a single annular ejection port will operate in a satisfactory manner under certain conditions of reduced particulate loading of the gas stream. Also although FIGS. 4, 5 and 6 disclose a conduit with apertures and a filter element placed over it for the scavenging gas passage and separation means, the perforated conduit could be replaced by other support means for the filter element such as a wire framework. Also the filter element could be sufficiently rigid to provide its own support means. Further, persons skilled in the art will realize that other scavenging gas-particulate separation means, such as electrostatic precipitators, sonic agglomeration type separators, settling chambers, inertial separators, liquid contact scrubbers, as well as similar types of separation means may be utilized for the cleansing of the scavenging gas stream, within the limitation of the pressure differential available for the operation of such means.

I claim:

1. A separator for removing from a gas stream suspended particulates present in the gas stream, comprising:

a scavenging gas plenum defined by wall structure, said wall structure including wall means defining an outlet plenum in fluid communication with an outlet, an inlet means for receiving gas from a gas stream, said inlet conduit means extending into said scavenging gas plenum and having a downstream end located in said scavenging gas plenum, gas swirl means for imparting a swirling motion to the gas entering said inlet conduit means, conduit means axially aligned with said inlet conduit means and having an upstream end located relative to said downstream end of said inlet conduit means defining an annular ejection port in said scavenging gas plenum for the removal of suspended particulates that have separated from the gas stream due to the swirling motion imparted to the gas entering said inlet conduit means, and for the discharge of a portion of the gas into said scavenging gas plenum, said conduit means axially aligned with said inlet conduit means, having an outlet end extending from said scavenging gas plenum through said wall means to said outlet plenum, a conduit having an outlet end extending from said scavenging gas plenum through said wall means to said outlet plenum providing a flow path from said scavenging gas plenum to said outlet plenum for the flow of gas from said scavenging gas plenum to said outlet plenum, separation means for separating particulates from the gas flowing from said scavenging gas plenum to said outlet plenum by way of said conduit, said outlet ends of said conduit means and of said conduit generally facing each other in said outlet plenum, and means for removing separated particulates from said scavenging gas plenum.

2. A separator for removing from a gas stream suspended particulates present in the gas stream, comprising:

a scavenging gas plenum defined by wall structure, said wall structure including first and second wall means which face other and interconnecting wall means extending between said first and second wall means defining an outlet plenum in fluid communication with an outlet, an inlet conduit for receiving gas from a gas stream, said inlet conduit extending into said scavenging gas plenum and having a downstream end located in said scavenging gas plenum, gas swirl means for imparting a swirling motion to the gas entering said inlet conduit, conduit means axially aligned with said inlet conduit and having an upstream end located relative to said downstream end of said inlet conduit defining an annular ejection port in said scavenging gas plenum for the removal of suspended particulates that have separated from the gas stream due to the swirling motion imparting to the gas entering said inlet conduit and for the discharge of a portion of the gas into said scavinging gas plenum, said conduit means having an outlet portion extending out of said scavinging gas plenum through said first wall means to said outlet plenum, flow path means extending from said scavenging gas plenum through said second wall means to said outlet plenum, for the flow of gas from said scavenging gas plenum to said outlet plenum, means for separating particulates from the gas flowing from said scavenging gas plenum to said outlet plenum by way of said flow path means.

3. The separator of claim 2, comprising: means for removing from said scavenging gas plenum separated particulates.

4. The separator of claim 2, wherein said conduit means comprises:

a separation conduit located in said scavenging gas plenum in axial alignment with said inlet conduit, the upstream end of said separation conduit being located relative to the downstream end of said inlet conduit defining said annular ejection port for the removal of suspended particulates that have separated from the gas stream and for the discharge of gas into said scavenging gas plenum, and an outlet conduit axially aligned with said separation conduit and having a downstream end extending from said scavenging gas plenum through said first wall means to said outlet plenum, said outlet conduit having an upstream end located relative to the downstream end of said separation conduit defining a second annular ejection port for the removal of suspended particulates and for the discharge of gas into said scavenging gas plenum.

5. The separator of claim 4, comprising:
means for removing from the scavenging gas plenum separated particulates.

6. A separator for removing from a gas stream suspended particulates present in the gas stream, comprising:

wall structure defining a scavenging gas plenum, said wall structure including first and second wall means which face each other and interconnecting wall means extending between said first and second wall means defining an outlet plenum within said scavenging gas plenum in fluid communication with an outlet, said scavenging gas plenum comprising first and second portions on opposite sides of said outlet plenum in fluid communication with each other, an inlet conduit for receiving gas from a gas stream, said inlet conduit extending into said scavenging gas plenum and having a downstream end located in said first portion of said scavenging gas plenum, gas swirl means for imparting a swirling motion to the gas entering said inlet conduit, conduit means axially aligned with said inlet conduit and having an upstream end located relative to said downstream end of said inlet conduit defining an annular ejection port in said first portion of said scavenging gas plenum for the removal of said suspended particulates that have separated from the gas stream due to the swirling motion imparted to the gas entering said inlet circuit and for the discharge of a portion of said gas into said scavenging gas plenum, said conduit means having an outlet end extending from said first portion of said scavenging gas plenum through said first wall means to said outlet plenum, tube means located in said second portion of said scavenging gas plenum and having an end portion extending through said second wall means to said outlet plenum for the flow of gas from said second portion of said scavenging gas plenum to said outlet plenum, and filter means for separating particulates from the gas flowing from said second portion of said scavenging gas plenum to said outlet plenum by way of said tube means.

* * * * *